(12) United States Patent
Fairman et al.

(10) Patent No.: US 6,898,172 B2
(45) Date of Patent: May 24, 2005

(54) SYSTEM TO REDUCE WRITING OVERHEAD TO A HYBRID OPTICAL DISC

(75) Inventors: Donald A. Fairman, Spencerport, NY (US); Bruce Ha, Webster, NY (US); William J. Mueller, West Henrietta, NY (US); Larry L. Smearer, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 794 days.

(21) Appl. No.: 09/878,851

(22) Filed: Jun. 11, 2001

(65) Prior Publication Data

US 2002/0196729 A1 Dec. 26, 2002

(51) Int. Cl.[7] .................................................. G11B 7/24
(52) U.S. Cl. .............................. 369/275.3; 369/53.24; 369/275.4
(58) Field of Search .................. 369/275.3, 275.1, 369/275.2, 47.22, 53.22, 275.4, 53.24, 47.21, 44.13, 59.1, 53.11, 53.21, 53.2, 47.54; 428/64.1, 64.3, 64.4

(56) References Cited

U.S. PATENT DOCUMENTS 5,559,778 A * 9/1996 Inokuchi et al. ......... 369/53.24
6,115,353 A * 9/2000 Horie et al. ............. 369/275.4
6,671,249 B2 * 12/2003 Horie ..................... 369/275.3

OTHER PUBLICATIONS

Wrobel, The physics of recording in write–once optical storage materials, Proceedings of SPIE, vol. 420, 1983, pp. 288–293.

* cited by examiner

*Primary Examiner*—Ali Neyzari
(74) *Attorney, Agent, or Firm*—Raymond L. Owens

(57) ABSTRACT

A hybrid disc including a preformed portion; and the preformed portion including a partial preformed session and a writeable portion including a wobbled groove which is adapted to be written to by a writer to complete the partial preformed session.

6 Claims, 12 Drawing Sheets

SYSTEM TO REDUCE WRITING OVERHEAD TO A HYBRID OPTICAL DISC

CROSS REFERENCE TO RELATED APPLICATIONS

Reference is made to commonly assigned U.S. patent application Ser. Nos. 09/393,527 filed Sep. 10, 1999, entitled "Hybrid Optical Recording Disc with Copy Protection" by Ha et al, U.S. patent application Ser. No. 09/772,333 filed Jan. 29, 2001, entitled "Copy Protection Using a Preformed ID and a Unique ID on a Programmable CD-ROM" by Barnard et al, U.S. Ser. No. 09/772,149 filed Jan. 29, 2001, entitled "Copy Protection Using Multiple Characteristic Signatures and a Unique ID on a Programmable CD-ROM" by Barnard et al, U.S. patent application Ser. No. 09/775,150 filed Feb. 1, 2001, entitled "Method for Customizing Programmable CD-ROM" by Lawson et al, U.S. patent application Ser. No. 09/819,232 filed Mar. 28, 2001, entitled "Catalog Merchandising Using Hybrid Optical Disc" by Mueller et al, U.S. patent application Ser. No. 09/819,231 filed Mar. 28, 2001, entitled "Credit or Debit Copy-Protected Optical Discs" by Inchalik et al, U.S. patent application Ser. No. 09/878,446 filed concurrently herewith, entitled "Delivery of Electronic Content Over a Network Using a Hybrid Optical Disc for Authentication", by Inchalik et al, U.S. patent application Ser. No. 09/878,532 filed concurrently herewith, entitled "Access to Electronic Content Over a Network Using a Hybrid Optical Disc for Authentication", by Inchalik et al, the disclosures of which are incorporated herein by reference.

FIELD OF THE INVENTION

The present invention relates to hybrid optical discs and more particularly to a method for reducing the amount of data that must be written to a hybrid optical disc by a disc writer.

BACKGROUND OF THE INVENTION

Hybrid optical recording discs are discs having a read-only memory (ROM) area containing pre-authored digital content and a recordable area for writing additional data which are recorded on the disc by a recorder or writer controlled by a computer. Such a disc has a substrate which can be formed by injection molding against a master plate so that the mastered substrate will have a continuous spiral track extending from a specified inner radius to a specified outer radius of the substrate. The spiral track is usually a groove which provides data channels on the disc and also provides for tracking of the disc while reading or recording data. The groove is wobbled with a characteristic frequency in a direction normal to the groove and is, therefore, referred to as a wobbled groove or a wobble groove. In the ROM area of a hybrid optical disc the groove is further modulated in the form of depressions which correspond to disc addressing data and to disc program data. The mastered substrate is then coated with a recording layer which can include an organic dye selected to absorb radiation in the recordable wavelength of the writer. Upon coating the recording layer with a metal layer, a reflective layer is formed over the entire recording layer. A protective layer, usually of a polymer organic material, is formed over the reflective layer.

Hybrid optical discs follow the specifications of the Orange Book and the Red Book, published by Philips Electronics N.V. and Sony Corporation. The Orange Book specifies that the logical structure of hybrid discs largely follow the specifications for Read-Only-Memory CD's (CD-ROM) and Write-Once CD's (CD-WO). In particular, the smallest division that a disc can have and be considered complete (or "fixated") is known as a "session". In its most basic form, a session includes three major segments. A session includes a preliminary area, called the "lead-in", which identifies the start of a session and includes certain specified information about the session, such as the table of contents. The lead-in area is followed by the data, which consists of a series of blocks of digital data encoded in eight-to-fourteen modulation (EFM). The data can be from numerous sources in numerous digital formats, including audio, executable applications, video, photographic images, numerical data, etc. The session is completed by a "lead-out" section, which signals the end of the session, and also points to the next session, if it exists.

A hybrid optical disc generally consists of one or more sessions of preformed data that are mastered onto the disc by any well-known mastering techniques. The mastering process also formats the remainder of the disc as a write-once recordable area. The master produced this way is then used in any well-known molding or stamping technique to mass-produce hybrid optical discs with a pre-recorded area, containing one or more sessions, and a recordable area. A user may then record information in the recordable area in a secondary writing operation using a writing device (such as a CD-R or CD-RW drive), usually attached to a computer system.

The sessions that were mastered on the discs were fixated, and cannot be added to, so the newly recorded information is recorded to a new session. While certain writing techniques (called Track-at-once recording and packet recording) allow less than a complete session to be written at once, the session is not considered complete until both the lead-in and lead-out are written. This process is called fixating in the art. Once a session is fixated, it is defined as complete by Orange Book standards and no further data may be written to it.

Sometimes, it is desired to write a small amount of unique user data to each disc. An example of this would be writing a unique serial number to each to differentiate that disc from all others in subsequent use. Another example would be a user's name and address. The Orange Book specifies that a session must have at least 300 blocks (of 2048 bytes each) of information, which is about 614 Kbytes. As also defined by the Orange Book, each session must also have lead-in and lead-out areas, which require an additional 13.8 megabytes of data that must be written for each session. Current systems require that this lead-in and lead-out data be written at the same time as, or after, the unique user data is written. Thus, conventional systems need to write 14.4 megabytes of data to the disc, even if the unique data of interest is only a very small fraction of this.

Since 614 kilobytes corresponds to 100 to 200 pages of typed text, it will be clear that there are many cases (in addition to serial numbering mentioned above) in which only a small amount of user data needs to be written to a disc. In these cases, the disc writer spends a disproportionate amount of time writing the 13.8 megabytes of session structural data in comparison to the amount of data being written.

SUMMARY OF THE INVENTION

It is therefore an object of the present invention to minimize the amount of data that must be written in a secondary writing operation to an optical disc, and to eliminate some of the overhead time required in such writing.

This object is achieved by a hybrid disc comprising:

a) a preformed portion; and b) the preformed portion including a partial preformed session and a writeable portion including a wobbled groove which is adapted to be written to by a writer to complete the partial preformed session.

This invention reduces the amount of information that needs to be written to an optical disc by a secondary writing operation. This reduces the time needed for this writing operation, resulting in much faster throughput using writers of any given writing speed.

A further advantage is that this invention allows single-session-only optical disc formats (e.g. CD digital audio or video) to be personalized for the end-user.

DETAILED DESCRIPTION OF THE INVENTION

Figure 1:
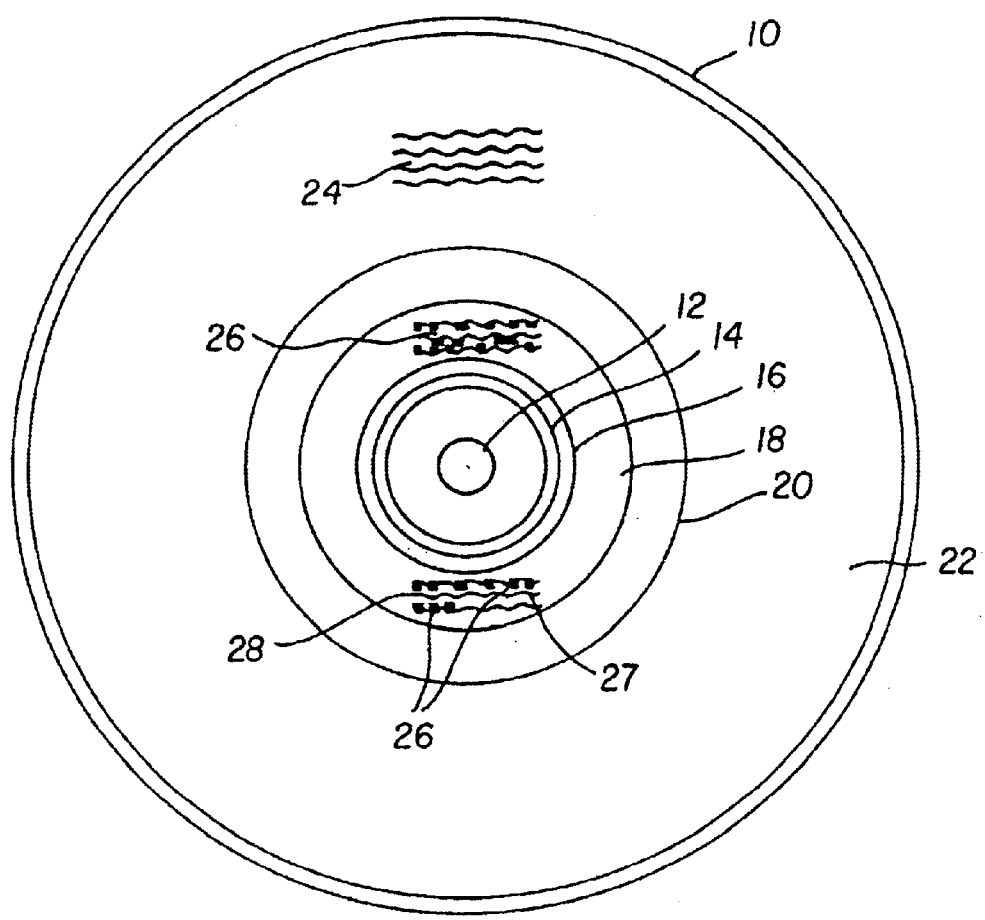
FIG. 1 shows a hybrid optical disc which has been mastered in accordance with this invention.

Turning now to FIG. 1, we see a hybrid optical disc 10 which has been mastered and stamped in accordance with this invention, but which has not yet been written to in a secondary writing operation. By "hybrid optical disc" we mean an optical disc that includes mastered and stamped (i.e. preformed) information and also one or more area(s) that can be written to by optical-disc writing techniques. Central hole 12 permits hybrid optical disc 10 to be mounted in a disc transport device of an optical disc drive, such as a CD-ROM or CD-RW drive. Hybrid optical disc 10 is composed of a substrate such as polycarbonate in accordance with Orange Book and Red Book standards. Hybrid optical disc 10 in this embodiment also includes power control area 14 and program management area 16. A preformed portion 18 is mastered and stamped on hybrid optical disc 10. Hybrid optical disc 10 also can include writeable portion 22 which can be written to with standard optical disc writers such as CD-R and CD-RW drives. Writeable portion 22 can also be called the first writeable portion. The disc can optionally include a second mastered session 20 or subsequent mastered sessions.

In accordance with Orange Book specifications for hybrid discs, hybrid optical disc 10 is mastered with a spiral groove with a frequency-modulated wobble called Absolute Time In Pregroove (ATIP). It is therefore called a wobbled groove or wobble groove. A segment of this wobbled groove is shown schematically as frequency-modulated wobbled groove 24. In preformed portion 18, the groove is also depth-modulated by modulating the intensity of the mastering laser in a way that corresponds to the data to be recorded in preformed portion 18. A segment of such groove is shown schematically as frequency-and-depth-modulated wobbled groove 26, in which dots and dashes interspersed with the wavy outline indicate the deeper segments of the groove.

Certain predetermined sections of preformed portion 18 are left blank, that is, only frequency-modulated with the ATIP signal. These frequency-modulated sections remain writeable. A preformed portion 18 with a writeable portion within it is referred to as a partial preformed session. A schematic representation of a segment of this is shown as partial preformed session 28 comprising writeable portion 27 and frequency-and-depth-modulated wobbled groove 26. Writeable portion 27 is equivalent to frequency-modulated wobbled groove 24 in ability to accept laser-written marks and can therefore be written to by an optical-disc-writing laser. If writeable portion 22 is present on hybrid optical disc 10, writeable portion 27 can also be called the second writeable portion.

Figure 2A:
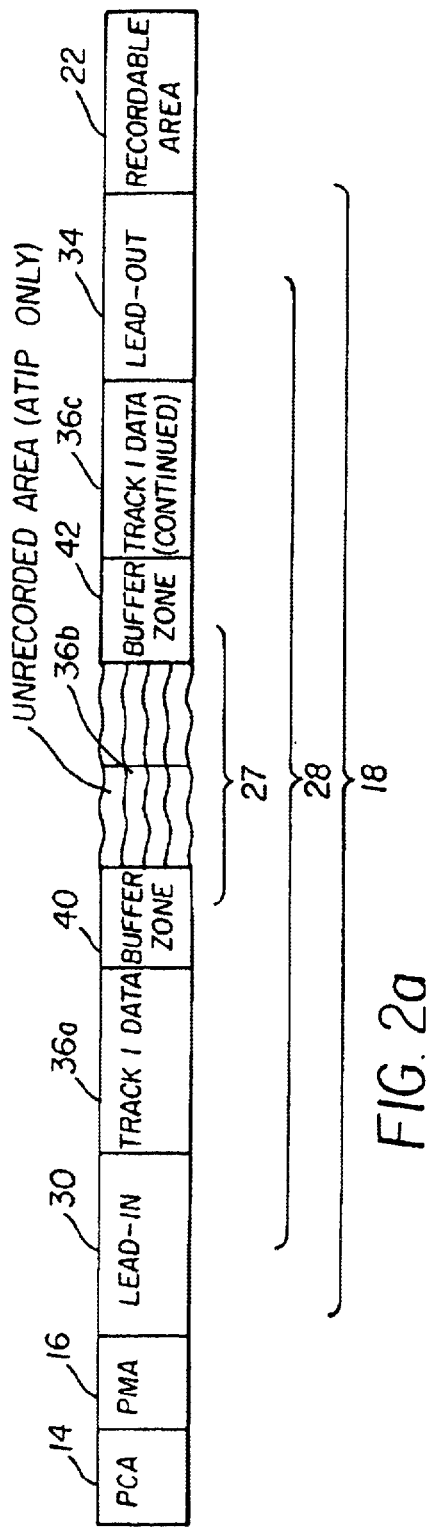
FIG. 2a is a schematic of the data layout of a disc prepared according to one embodiment of this invention.

Turning now to FIG. 2a, we see a schematic of the data layout in one possible embodiment of this invention. The inner recording area of hybrid optical disc 10 includes power control area 14 and program management area 16. The outer recording area can include writeable portion 22, which includes only the frequency-modulated wobbled groove 24. The mastered area of the disc includes a preformed portion 18 comprising one or more sessions, each of which includes lead-in area 30, one or more data tracks 36, and lead-out area 34. Partial preformed session 28 in this embodiment includes a single data track 36. In accordance with this invention, it includes at least one partial track of preformed data (shown as partial data tracks 36a and 36c) and one or more unwritten partial tracks 36b (also known as writeable portion 27) in which no data is written or impressed, and which comprise only frequency-modulated wobbled groove 24. Each unwritten partial track 36b is preceded by a buffer zone 40 and followed by another buffer zone 42. The nature of these buffer zones will be further elaborated in the course of this description.

Figure 2B:
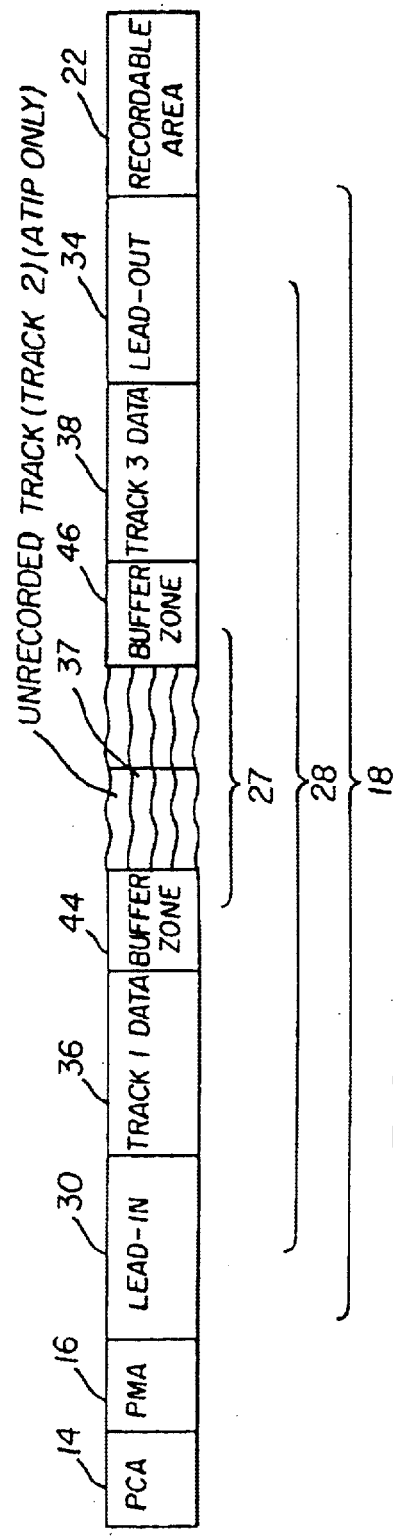
FIG. 2b is a schematic of the data layout of a disc prepared according to another embodiment of this invention.

Turning now to FIG. 2b, we see a schematic of the data layout in another possible embodiment of this invention. The inner recording area of the disc includes power control area 14 and power management area 16. The outer recording area can include first writeable portion 22, which includes only the frequency-modulated wobbled groove 24. The mastered area of the disc includes a preformed portion 18 comprising one or more sessions, each of which includes lead-in area 30, one or more data tracks 36, 37, and 38, and lead-out area 34. Partial preformed session 28 in this embodiment includes several data tracks 36, 37, and 38. In accordance with this invention, data tracks 36 and 38 comprise preformed data. Hybrid optical disc 10 further includes one or more unwritten full tracks 37 in which no data is written or impressed, but which comprise only the frequency-modulated wobbled groove 24. Each unwritten full track 37 is preceded by buffer zone 44 and followed by another buffer zone 46. The nature of these buffer zones will be further elaborated in the course of this description.

In this particular embodiment, the disc includes a single mastered session, which for illustration includes three tracks. It will be appreciated that Orange Book specifications allow multiple sessions, which can be mastered onto the disc as well. It will be further appreciated that each session can consist of one or more tracks, any of which can be interrupted by one or more writeable portions 27 as embodied in this invention.

Figure 3:
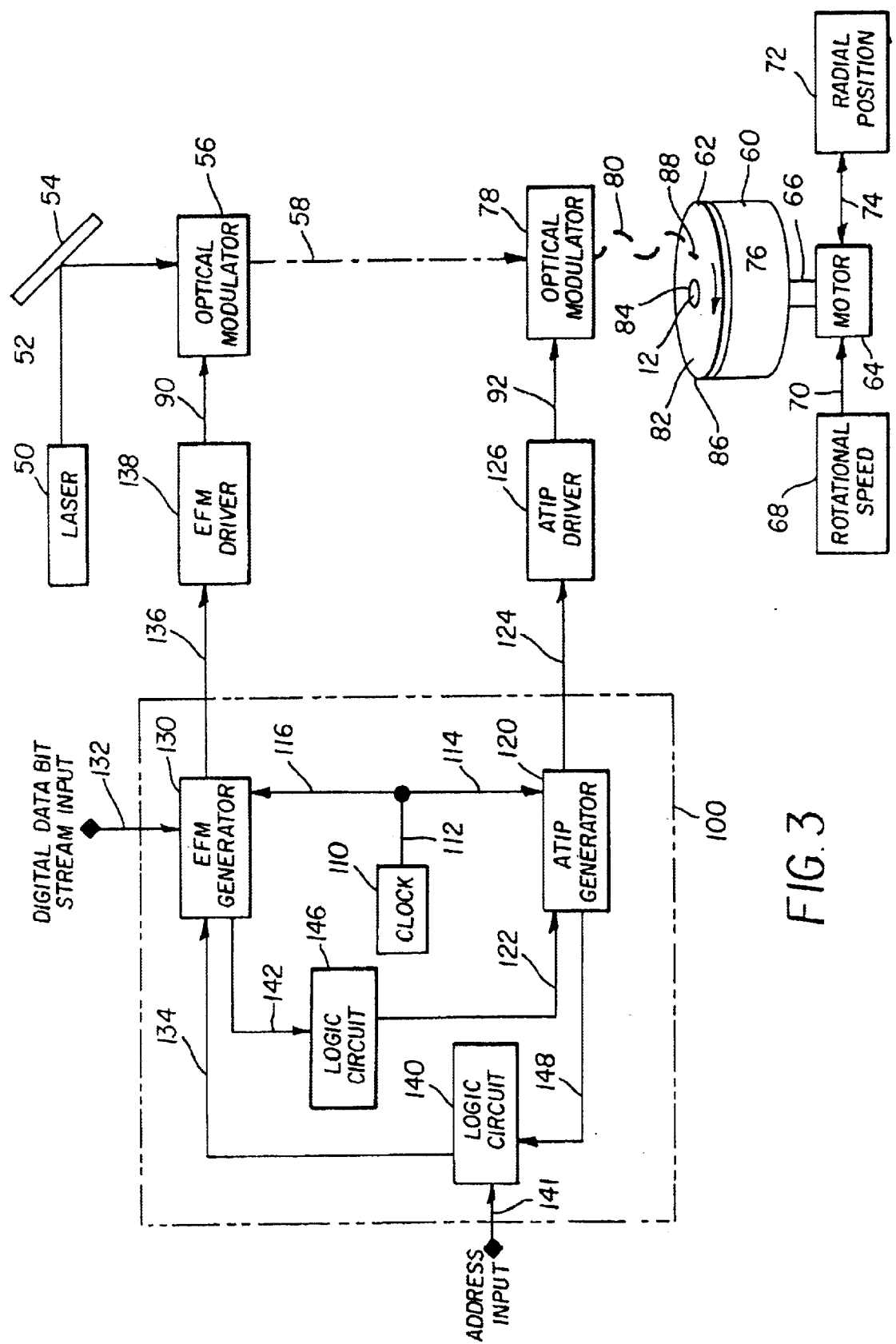
FIG. 3 is a block diagram of a first embodiment of a laser beam recording system in accordance with the present invention for recording concurrently a frequency-modulated-wobbled and intensity-modulated groove on a photoresist master disc.

Turning to FIG. 3, there is shown a block diagram of a first embodiment of a laser beam recording system for making a photoresist master disc from which a stamper can be fabricated for forming a hybrid optical recording disc incorporating this invention. Laser 50 emits laser beam 52 of activating radiation to which photoresist layer 62 of photoresist master disc 60 is responsive. Laser beam 52 is directed by mirror 54 to first optical modulator 56 which is dedicated to modulate the intensity of laser beam 52 in response to signals provided by EFM driver 138 via lead 90. Intensity-modulated laser beam 58, depicted in bold, dashed, and dotted outline, is directed to second optical modulator 78 dedicated to provide intensity-modulated laser beam 58 with frequency modulation in response to signals provided by ATIP driver 126 via lead 92. Frequency-and-intensity-modulated laser beam 80 is schematically indicated in a wavy outline with bold dots and dashes. Frequency-and-intensity-modulated laser beam 80 is focused by optical elements (not shown) to be incident on photoresist layer surface 82 at laser incidence point 88.

Photoresist master disc 60 is rotated by motor 64 via drive spindle 66 in direction of disc rotation 76 during the recording process. The motor is operated under motor rotational speed control 68. The radial position of incidence of frequency-and-intensity-modulated laser beam 80 on photoresist master disc 60 is determined by radial position control 72 via radial position linkage 74. This exposes in photoresist layer 62 a continuous spiral groove extending from specified inner radius 84 to specified outer radius 86 of photoresist master disc 60, whereby the spiral groove is frequency-modulated to form a wobble and is intensity-modulated to form a groove with various depths in correspondence with recorded data.

Laser beam modulation control system 100 has a central clock 110 which provides clock pulses via leads 112 and 114 to ATIP generator 120, and to EFM generator 130 via lead 116. "ATIP" is a commonly used abbreviation for "absolute time in pregroove" and "EFM" is a commonly used abbreviation for "eight-to-fourteen modulation". ATIP generator 120 and EFM generator 130 are also referred to as ATIP encoder and EFM encoder, respectively. ATIP generator 120 is operative to provide control of the laser beam recording system in that ATIP generator 120 provides all of the timing functions (e.g. minutes, seconds, and frames of the data area) in accordance with specifications included in the aforementioned "Orange Book." ATIP generator 120 also provides a frequency-modulating signal via lead 124 to ATIP driver 126 which, in turn, drives optical modulator 78 via lead 92. This frequency-modulating signal, also referred to as a wobble-frequency signal, includes a carrier frequency of 22.5 kHz which is modulated with a frequency deviation of ±1 kHz.

EFM generator 130 has digital data input lead 132 for receiving input signals from an external source (not shown) in the form of a digital data bit stream. The external data source can be, for example, a CD-ROM. EFM generator 130 generates EFM signal pulses representative of 14-bit data streams and these pulses are directed to EFM driver 138 via lead 136, and from EFM driver 138 via lead 90 to optical modulator 56 for modulating the intensity of the laser beam in correspondence with the data stream from EFM generator 130.

Laser beam modulation control system 100 further includes circuitry for controlling temporal relationships between and among ATIP generator 120 and EFM generator 130 so that respective ATIP signals and EFM signals are temporally correlated to provide concurrent operation of first and second optical modulators 56 and 78. For control of temporal relationships, FIG. 3 depicts two logic circuits which link ATIP generator 120 and EFM generator 130. First logic circuit 140 receives, from ATIP generator 120 via lead 148, timing flag pulses which are sequenced in accordance with the timing function of ATIP generator 120. Logic circuit 140 conveys these timing flag pulses to an input of EFM generator 130 via lead 134. Logic circuit 140 has a means for inputting the address at which special events occur during the mastering process. This is depicted as address input 141. In addition, ATIP generator 120 provides, to EFM generator 130 via logic circuit 140, other pulsed signals, such as for example, SYNC pulse signals (synchronization pulse signals).

Second logic circuit 146 provides a logic communication link between EFM generator 130 and ATIP generator 120 via leads 142 and 122, respectively.

The logic signals communicated among ATIP generator 120 and EFM generator 130 provide so-called flag signals, or flags, which are hardware-based rather than requiring the decoding of software-based instructions.

Hardware-based logic communication among ATIP generator 120 and EFM generator 130 proceeds in practice as follows: EFM generator 130 first instructs ATIP generator 120 via logic circuit 146 about its readiness to produce intensity-modulating EFM signals corresponding to the input signals at digital data input lead 132. Upon receiving such instruction from EFM generator 130, ATIP generator 120 communicates timing signals to EFM generator 130 via logic circuit 140. Since ATIP generator 120 controls the timing sequence, it controls when to switch from exposing a frequency-and-depth-modulated wobbled groove 26 to exposing a nominally deep frequency-modulated-wobbled groove 24, and vice versa, in photoresist layer 62. ATIP generator 120 controls EFM generator 130 as to when to change the laser beam intensity via EFM driver 138 and optical modulator 56. Address input 141 provides an additional control to override depth-modulated writing and write frequency-modulated wobbled groove 24 only.

These hardware-based logic flag signals (representing 1s and 0s) provide for microsecond response of the laser beam intensity modulation in optical modulator 56.

Figure 4A:
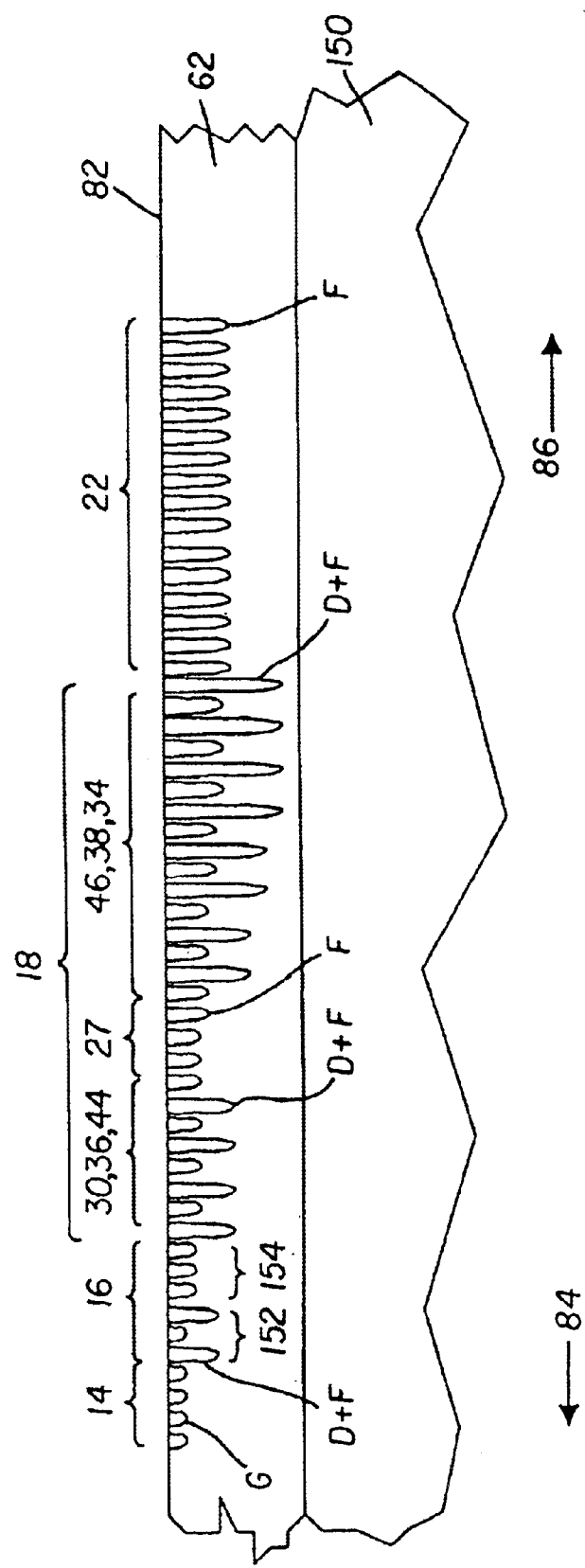
FIG. 4a is a schematic diagram of a disc mastered according to this invention, having non-recordable, or ROM, areas (frequency-modulated-wobbled and depth-modulated groove) and recordable areas (only a frequency-modulated-wobble groove with a fixed depth)

Turning now to FIG. 4a, a schematic diagram is shown of a portion of the master disc produced from the apparatus diagrammed in FIG. 3. The left side of the diagram depicts the inner part of the disc closest to specified inner radius 84, while the right side is closest to specified outer radius 86.

After the mastering process, photoresist layer 62, which is coated on master disc substrate 150, includes a spiral groove that includes frequency-and-depth-modulated wobbled groove 26 (that is, a ROM area including depressions in the writeable layer, labeled D+F) in some areas, and only frequency-modulated wobbled groove 24 in others (that is, a writeable area or writeable groove, labeled F). Photoresist layer 62 now includes several distinct areas. Power control area 14 consists of only frequency-modulated wobbled groove 24. Program management area 16 includes data area 152 (comprising frequency-and-depth-modulated wobbled groove 26) and unwritten area 154 (comprising frequency-modulated wobbled groove 24). Preformed portion 18 includes writeable portion 27 (only frequency-modulated wobbled groove 24, which is not depth-modulated), as well as pre-written data areas (frequency-and-depth-modulated wobbled groove 26). The latter include lead-in area 30, lead-out area 34, data areas 36 and 38, and parts of the buffer zones 44 and 46, and are shown together for clarity. The outer part of the disc includes the user-recordable writeable portion 22 (only nominal depth frequency-modulated wobbled groove 24, which is not depth-modulated) of hybrid optical disc 10. See commonly assigned U.S. patent application Ser. No. 09/662,561 filed Sep. 15, 2000 entitled "System For Making A Photoresist Master For A Hybrid Optical Recording Disc" by Ha et al, the disclosure of which is incorporated herein by reference.

Figure 4B:
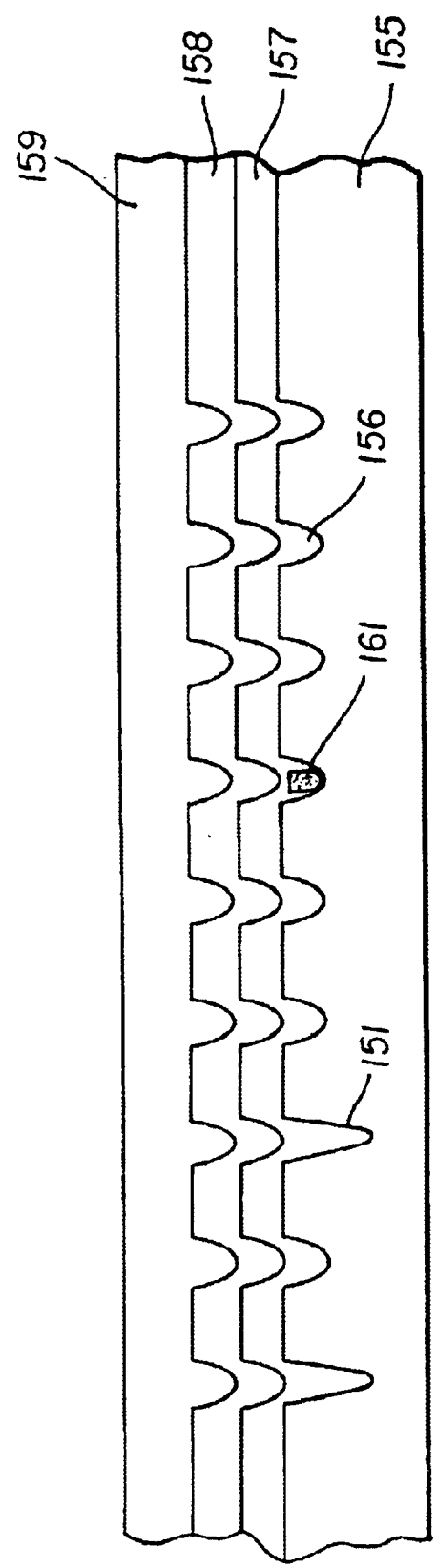
FIG. 4b is a schematic diagram of the cross-section of a microscopic portion of a hybrid disc produced from the above master disc.

The above-described master disc can be used in any well-known techniques for producing hybrid optical discs. Turning now to FIG. 4b, we see a schematic diagram of a very small cross-section of a hybrid optical disc 10 produced this way. Hybrid optical disc 10 is formed on substrate 155, which is generally comprised of a polymeric substance such as polycarbonate. The grooves and depressions that were formed in the master disc have been impressed in the substrate as grooves 156 and depressions 151. The impressed side of the substrate is further coated with writeable layer 157, reflective layer 158, and protective overcoat 159.

Writeable layer 157 is a layer which, when illuminated by a laser above a threshold power, generates an optically detectable region differing from the surrounding regions. This optically detectable region is also known as a mark, and is represented in FIG. 4b as mark 161. Writeable layer 157 can comprise e.g. an inorganic material that undergoes a phase change when illuminated by a laser above a threshold power. It can be a dye layer which fades or deforms when illuminated by a laser above a threshold power. It can even be the same layer as reflective layer 158, which forms a non-reflective hole when illuminated by a laser above a threshold power. Thus, mark 161 can take many forms, such as a burn hole through a metal layer, a phase change, a texture change, a bubble, or a faded or deformed dye. The materials and structures of writeable layers and marks have been discussed in great detail by Wrobel, "The physics of recording in write-once optical storage materials," *Proceedings of SPIE,* Volume 420, 1983, pp. 288–293, the contents of which is incorporated by reference.

Groove 156, which represents frequency-modulated wobbled groove 24, is adapted to be written to by an optical disc writer by virtue of writeable layer 157 and reflective layer 158 on the substrate. Groove 156 therefore represents writeable portion 22, sometimes known as the first writeable portion, and writeable portion 27, sometimes known as the second writeable portion. The first writeable portion and the second writeable portion are thus adapted to receive marks (i.e. to be written to) by an optical disc writer.

Depression 151 represents frequency-and-depth-modulated wobbled groove 26 and is thus a preformed portion of data formed in the substrate and made readable by virtue of reflective layer 158. To an optical disc reader, depression 151 is indistinguishable from mark 161.

Figure 5:
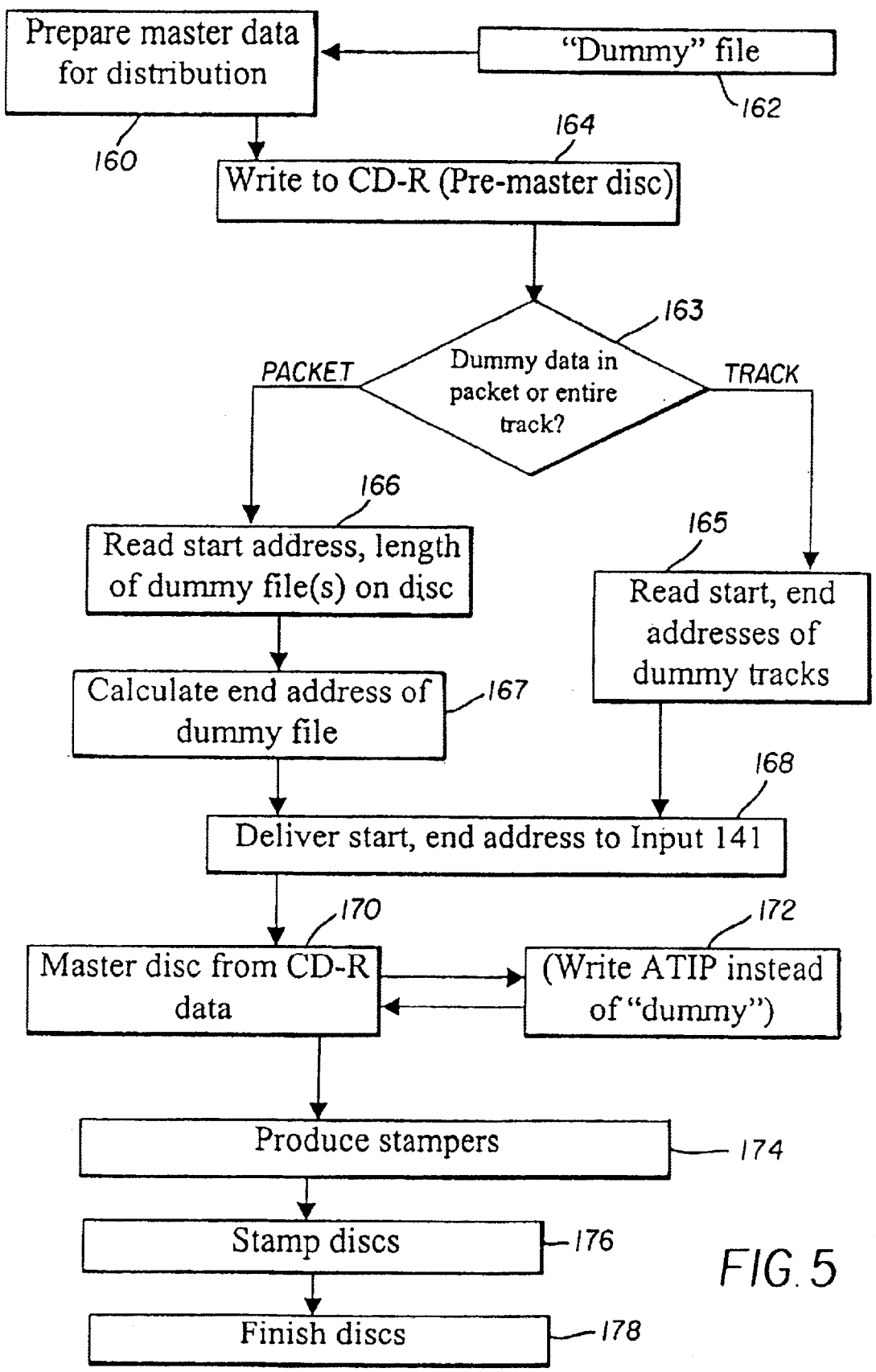
FIG. 5 is a block diagram showing the pre-mastering, mastering, and mass-production steps to manufacture a hybrid disc in accordance with this invention.

Now that we have described the physical means for preparing the master disc and subsequent stamped hybrid optical discs 10, we will describe the logical means for doing so. One preferred means includes a first step of authoring the data onto a "pre-master" written (i.e. CD-R or similar) disc. Turning to FIG. 5, and referring also to FIG. 3, we see a block diagram showing the steps in this process for creating a hybrid optical disc 10 with writeable portion 27 within preformed portion 18. First, the necessary data to be mastered is gathered together in step 160. Included in this data is one or more "dummy" files 162. Dummy file(s) 162 can contain any data, such as all zeroes, as long as it is the data file size that will be expected by the executing program. The master data, including the dummy files 162, is then written to a writeable optical disc (e.g. CD-WO, CD-R), using any available disc-writing software, to make a pre-master disc in step 164. If writeable portion 27 within preformed portion 18 will be unwritten full track 37, the start and end addresses of unwritten full track 37 can be read from the disc track data as specified in the Orange Book and Red Books (steps 163 and 165). If writeable portion 27 within preformed portion 18 will include packets within a track (that is, unwritten partial track 37b), the start address and length of dummy file 162 on the pre-master disc are read (step 163 and step 166) and the end address is calculated (step 167). Both the start and end addresses are delivered to logic circuit 140 via address input 141 (step 168) before or during the optical disc mastering process. A hybrid optical disc is mastered (step 170) using the data from the pre-mastered disc to digital data input lead 132. Using the address information provided via address input 141, logic circuit 140 will control EFM generator 130 (and therefore EFM driver 138 and optical modulator 56) to write only the nominal-depth frequency-modulated-wobbled groove 24 when dummy file 162 should have been written. Thus, only ATIP (i.e. frequency-modulated wobbled groove 24) is contained in that particular portion of the groove being written on the master disc (step 172).

Those skilled in the art will realize other methods of preparing master discs are possible. This description is not meant to limit the manner of preparation of the master disc for use in this invention.

The so-prepared master disc can then be used in any of a number of well-known techniques for producing optical hybrid discs 10 by producing first a stamper (step 174) and using the stampers in a stamping operation to produce optical hybrid disc 10 with writeable portion 27 within preformed portion 18 (step 176). This stamping operation (step 176) produces the substrate part of hybrid optical disc 10 in which the aforementioned preformed portion 18 and writeable portions 22 and 27 are formed in the substrate with the described characteristics. The discs are then finished (step 178) by coating with writeable layer 157, reflective layer 158, and protective overcoat 159.

Figure 6:
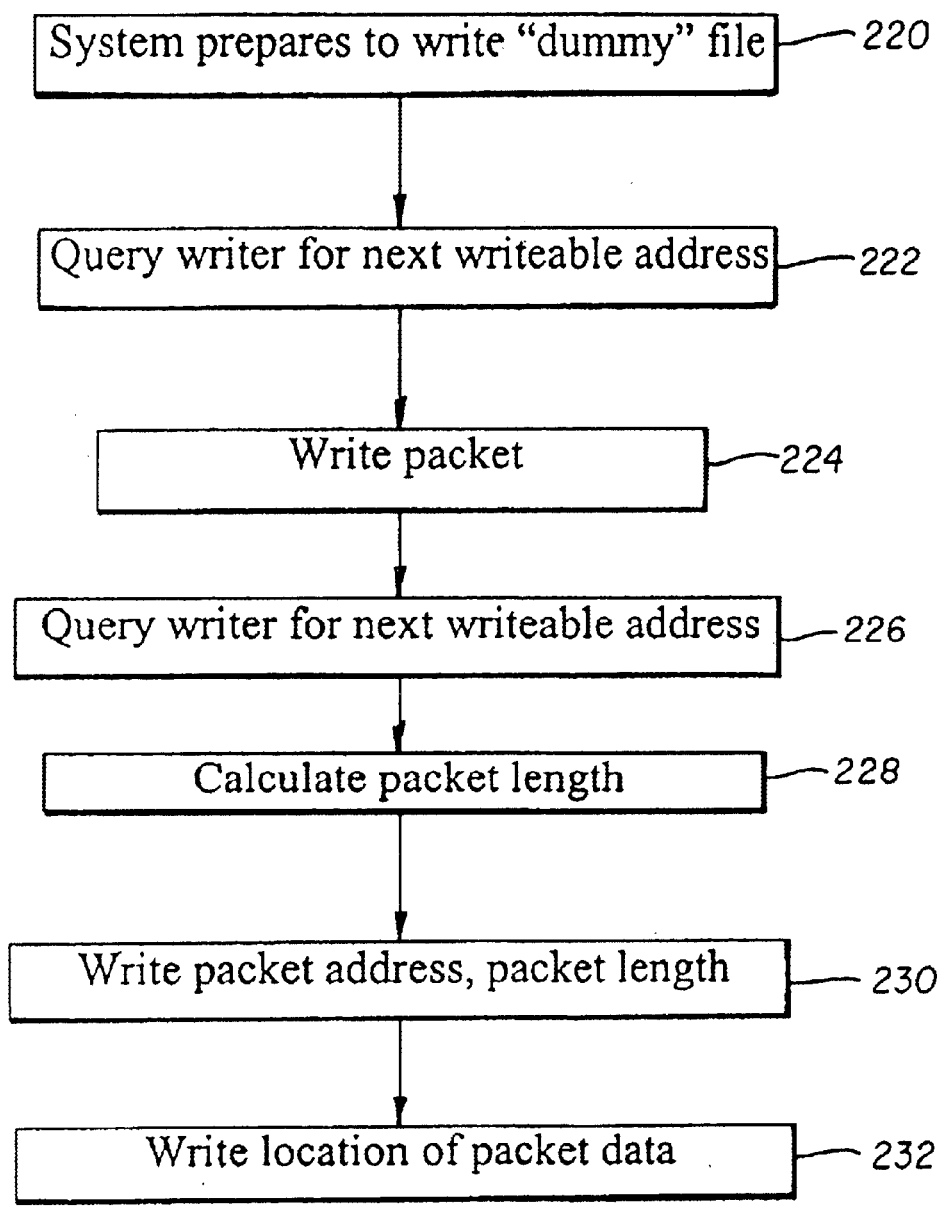
FIG. 6 is a block diagram showing the steps to preparing the pre-master disc.

In step 166, reference was made to reading the start address and the length of the dummy file. This information can be captured and recorded during the writing of the pre-master disc (step 164). Turning now to FIG. 6, we show one method for capturing and recording the correct addresses during the writing of the pre-master disc. As the system reaches the beginning of dummy file 162 that is intended to form writeable portion 27 in the master disc (step 220), the system queries the writer for the next writeable address (step 222). The system temporarily stores this address, and writes the packet (step 224), which includes "dummy" data. It can include all zeroes, or all ones, or any combination, so long as it is the data file size that will be expected by the executing program.

When the writing of the packet is finished, the system again queries the writer for the next writeable address (step 226). The system calculates the packet length from the packet start and end addresses (step 228). The packet address and packet length are written to the disc (step 230) at a known absolute sector address that the mastering equipment and the writer will later be programmed to look for. Thus, information stored in what will be preformed portion 18 of hybrid optical disc 10 (i.e. in frequency-and-depth-modulated wobbled groove 26) that specifies the location of writeable portion 27, also called second writeable portion. Also written to this position (step 232) is the location where the writer will find the data it will need to write. This can be a location or an instruction.

Figure 7A:
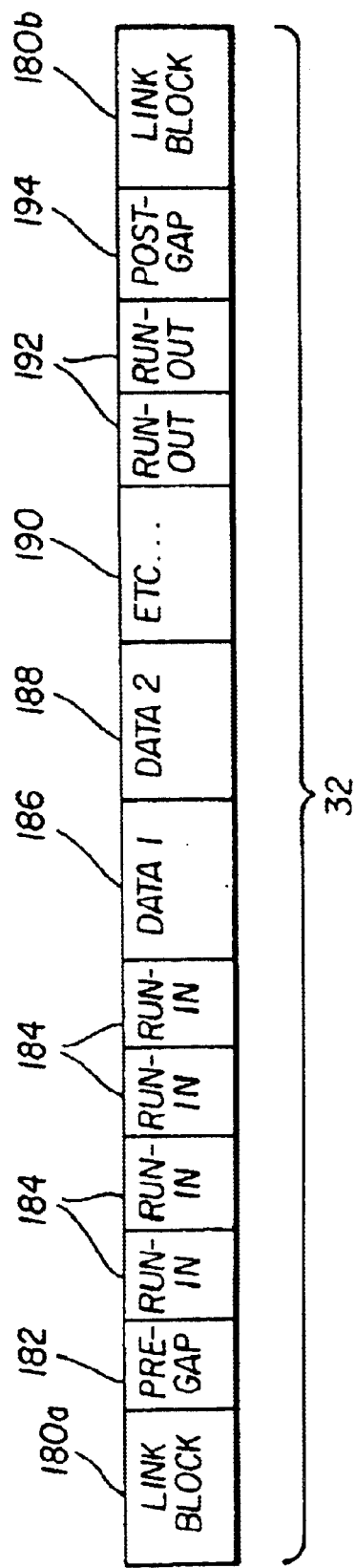
FIG. 7a is a schematic diagram of one embodiment of the data layout necessary to produce a hybrid disc in accordance with this invention.

The pre-master disc can be written in several ways in accordance with this invention and aforementioned Orange Book standards for CD-WO. Turning now to FIG. 7a, we see a first embodiment of the data structure in which the data has been written in a track-at-once mode as specified by the Orange Book. Data track area 32 includes track link blocks 180 before and after. The first track link block 180a is followed by track pre-gap 182, and then by four track run-in blocks 184. One or more data files 186, 188, 190 follow. If data track area 32 is the first track of preformed portion 18, then by Orange Book standards the first data file 186 must include an ISO 9660 file directory. The data files are followed by two track run-out blocks 192, a track post-gap 194, and a track link block 180b, which is also the first link block 180a of the next track. For the purposes of this invention, the dummy file or files 162 can be any data file 186, 188, etc.

For illustrative purposes, we will assume a first case in which data track area 32 is the first track of preformed portion 18 (in which case data file 186 includes the ISO 9660 file directory) and in which second data file 188 is the one we wish to become writeable portion 27. In FIG. 5, dummy file 162 is provided in step 160 and the address is read in step 166. This address is delivered to address input 141 in step 168. When laser incidence point 88 reaches the beginning of data file 188, logic circuit 140 switches off EFM generator 130 and EFM driver 138 so that only frequency modulated wobbled groove 24 comprising ATIP information is written for the duration of data file 188 (step 172). At the end of data file 188, logic circuit 140 restarts EFM writing. The resulting writeable portion 27 has an exact beginning and end. It is often impractical to do secondary writing to such a writeable portion 27 of hybrid optical disc 10, as many optical disc writers do not have the precision to write an exact string of data into exactly the correct location. For this reason, this is a non-preferred embodiment.

The aforementioned Orange Book recognizes the above writing limitation in providing link blocks between writing events. In FIG. 7a, track link blocks 180 provide the transitions in track-at-once writing. For illustrative purposes, we will assume a second case in which the entire data track area 32 is the part we wish to become writeable portion 27. In FIG. 5, data track area 32 is identified in step 165 and the start and end addresses of data track area 32 are read from the pre-master disc. The start and end addresses are delivered to address input 141 in step 168. When laser incidence point 88 reaches the beginning of data track area 32, logic circuit 140 switches off EFM generator 130 and EFM driver 138 at the $26^{th}$ EFM frame of track link block 180a, so that only the frequency-modulated wobbled groove 24 comprising ATIP information is written for the duration of data track area 32 (step 172). At the end of data track area 32, logic circuit 140 reinitiates EFM generator 130 at the $24^{th}$ EFM frame of track link block 180b.

Figure 7B:
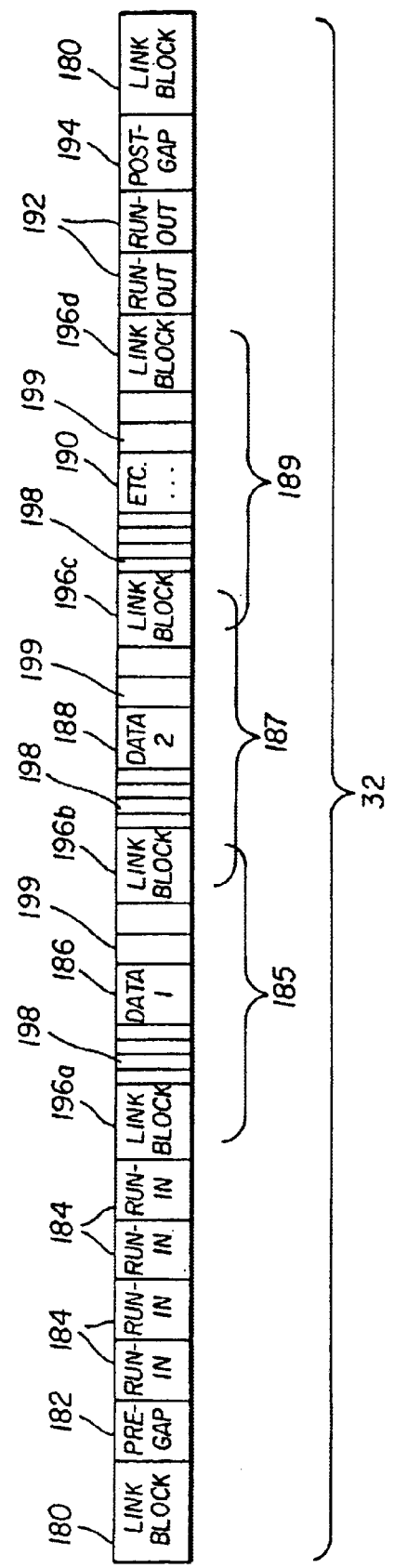
FIG. 7b is a schematic diagram of another embodiment of the data layout necessary to produce a hybrid disc in accordance with this invention.

Turning now to FIG. 7b, we see a preferred embodiment of the data structure of this invention for secondary writing of less than one track of data. In this embodiment, the data is written to the pre-master disc in packet writing, in which data track area 32 is written in one or more separate writing events, called packets. Data track area 32 includes all of the track structure illustrated in FIG. 7a, and also includes additional structural features with each separately-written packet of data. Packets containing data files 186, 188, and 190 are illustrated in FIG. 7b by packets 185, 187, and 189, respectively. Each packet starts with a packet link block shown as packet links 196a, 196b, 196c and 196d. Each pack link block is followed by four packet run-in blocks 198, the data, then two packet run-out blocks 199. As shown, the packet ends with a packet link block, which is also the starting link block for the next packet or (if there are no further packets) for the end of the data track area 32.

In the illustrated embodiment, the data to be left blank in the master disc includes the entire data area of a packet. Data track area 32 includes at least one packet which includes a file that will form writeable portion 27 after the mastering process.

For illustrative purposes, we will assume a third case in which data track area 32 is the first track of preformed portion 18 (in which case data file 186 includes the ISO 9660 file directory) and in which the second data file 188 is the one we wish to become writeable portion 27. In FIG. 5, dummy file 162 is provided in step 160 and the start address and length of packet 187 is read in step 166. The final address can be calculated from the start address and the length. The start and end addresses are delivered to address input 141 in step 168. When laser incidence point 88 reaches the beginning of packet 187, logic circuit 140 switches off EFM generator 130 and EFM driver 138 at the $26^{th}$ EFM frame of packet link block 196b, so that only frequency-modulated wobbled groove 24 comprising ATIP information is written for the duration of packet 187 (step 172). At the end of packet 187, logic circuit 140 reinitiates EFM generator 130 at the $24^{th}$ EFM frame of packet link block 196c.

Therefore, the preferred embodiments of this invention write the pre-master disc in the same manner as desired for secondary writing in the final hybrid optical disc 10. If it is desired to write an entire track, the pre-master disc is written in track-at-once writing mode. If it is desired to write less than an entire track, the pre-master disc is written in packet-writing mode.

Figure 8:
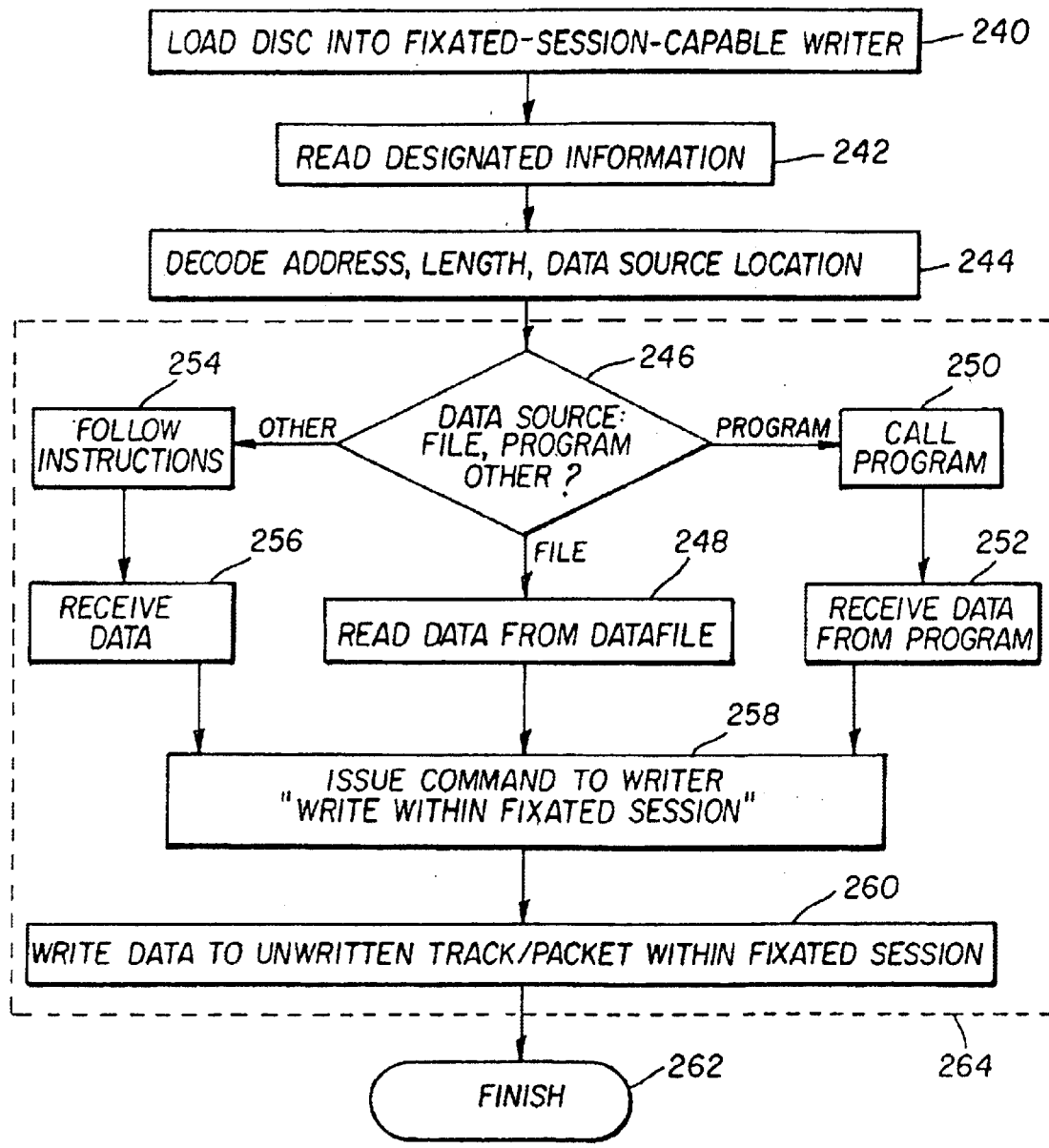
FIG. 8 is a block diagram showing the steps for writing in the blank area(s) within a fixated session on a hybrid disc.

Turning now to FIG. 8, we see the steps to complete partial preformed session 28 by writing to previously-described writeable portion 27. In step 240, hybrid optical disc 10 including one or more such writeable portions 27 in one or more partial preformed sessions 28 is placed into an optical disc of writer that is capable of writing to a previously-fixated session. The system issues the command to read the writeable portion information on the disc (step 242). Such information includes the starting address and length of writeable portion 27, and where the data to write will be found. It is stored in a known absolute sector address of the frequency-and-depth-modulated wobbled groove 26 (i.e. the ROM portion) of hybrid optical disc 10. In step 244, the system decodes this information, then determines if the data is to be found in a file, provided by a program, or generated some other way (step 246).

If the data is in a datafile, the system reads the data from the file (step 248) at the specified location (e.g. on a local hard drive, on a server, etc.). If a program (e.g. a DLL program) is to generate the data, the system calls the program in step 250 and receives the data from the program (step 252). If the data is to be generated another way, the system follows the instructions provided by the information (step 254) and receives the data according to the instructions (step 256).

Once the system has the data that will be written to disc, it issues a command to the writer to write the data at the specific location within the fixated session (step 258). In step 260, the writer writes the data in writeable portion 27. The writing steps 264 are repeated as many times as necessary, after which the process ends (step 262). The net result is that an optical disc writer writes marks 161 to writeable layer 157 of hybrid optical disc 10 within writeable portion or portions 27, which includes frequency-modulated wobbled groove 24 that is not depth-modulated, and thus completes partial preformed session 28.

Figure 9A:
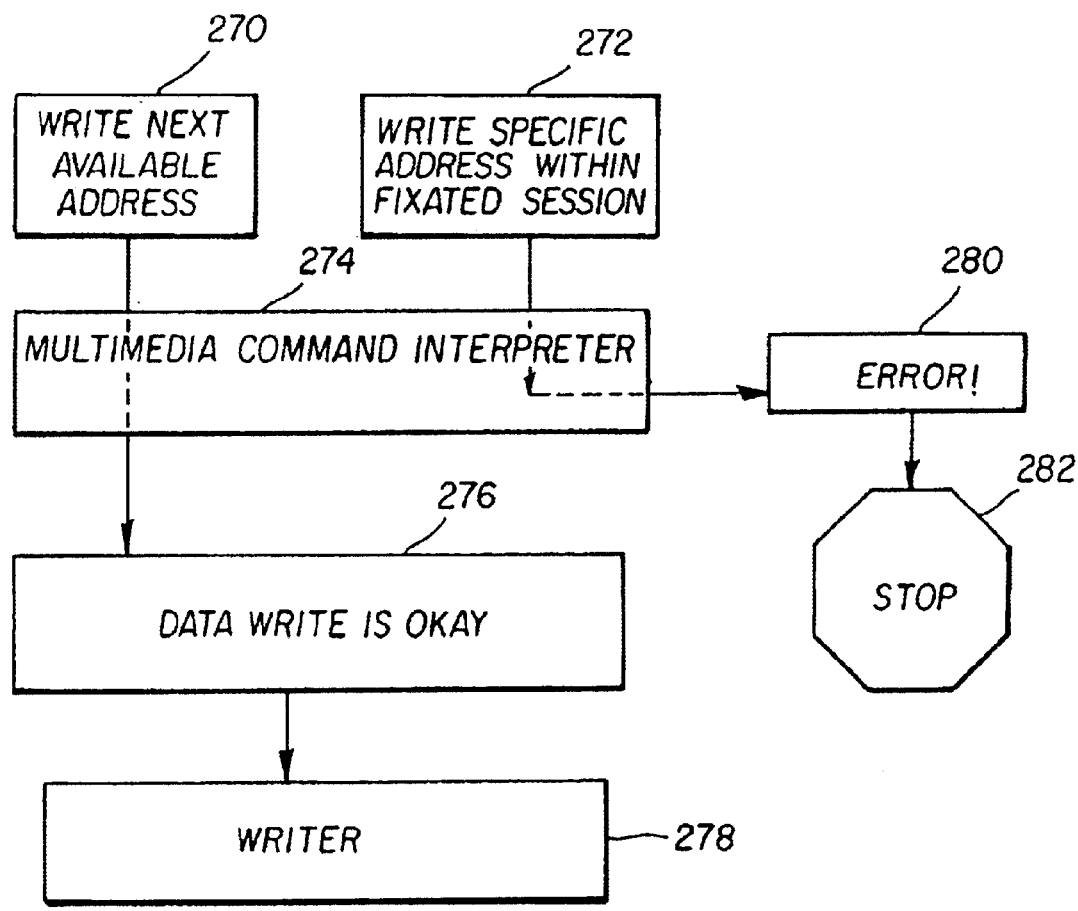
FIG. 9a is a block-type diagram showing the functioning of an industry-standard optical disc writer.

Turning now to FIG. 9, we see one method of changing the optical disc writer to implement this invention. FIG. 9*a* shows a block diagram representing one method of optical disc writer function. Optical disc writer 278, meaning the hardware level (including such parts as writing laser, tracking apparatus, and servo motors), is physically capable of writing to any position on hybrid optical disc 10. However, such optical disc writers commonly contain firmware that restricts this. This is shown schematically as multimedia command interpreter 274 and data writer control 276 in FIG. 9*a*. When write-next-available-address command 270 is issued by the host, multimedia command interpreter 274 recognizes the command as an industry-standard command and passes it on to data writer control 276. The data is then written on hybrid optical disc 10 by optical disc writer 278.

When write-within-fixated-session command 272 is issued to write within a previously-fixated session, multimedia command interpreter 274 does not accept it because it is not an industry-standard command and because multimedia command interpreter 274 sees a writing event inside a fixated session as an illegal request. It does not pass this request on to the hardware, but instead creates error condition 280, passes an error message back to the host, and stops writing (step 282).

Figure 9B:
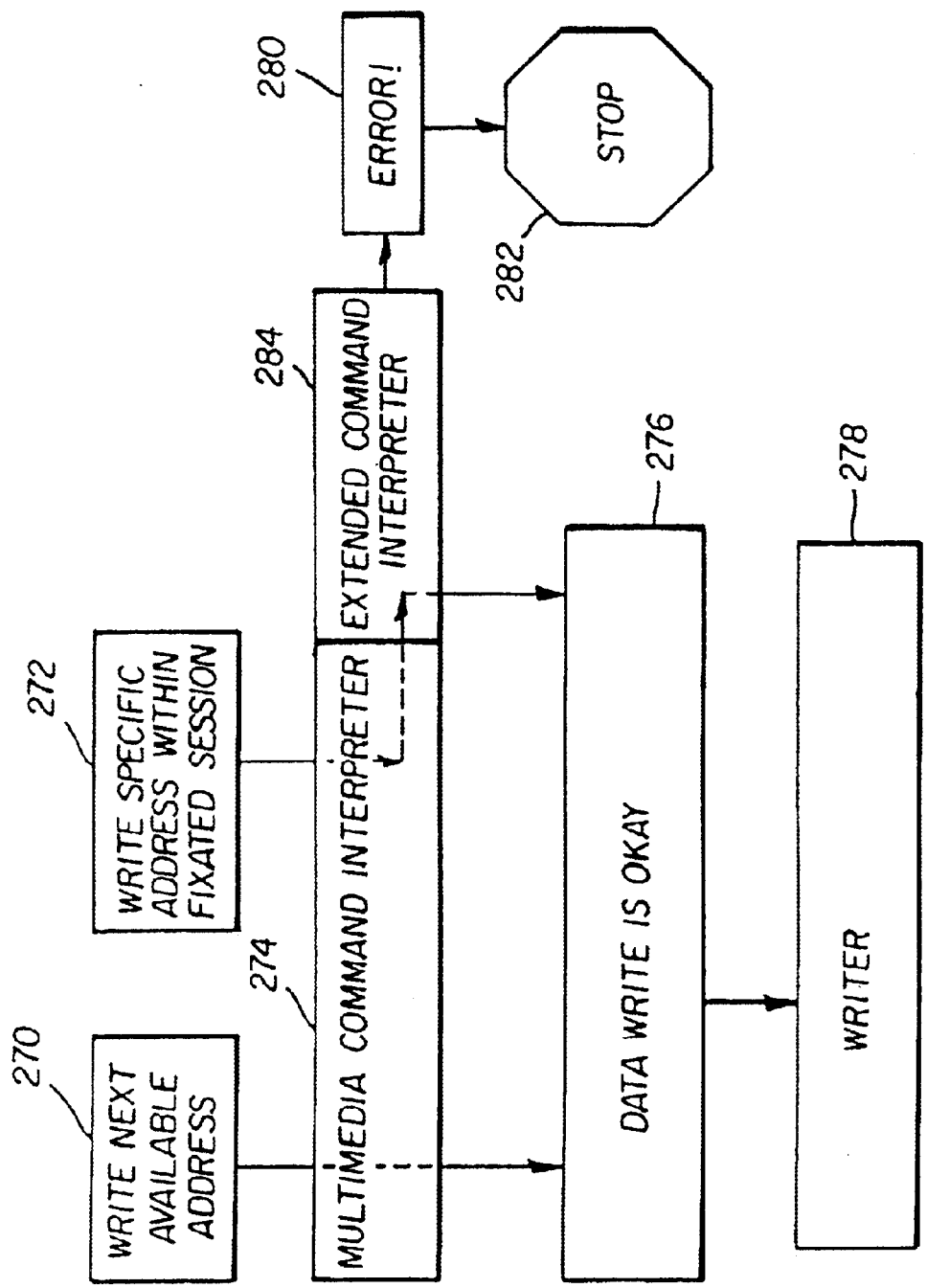
FIG. 9b is a block-type diagram showing additional functioning to enable this invention.

FIG. 9*b* shows one type of modification that can be made to such a system to allow writing within a fixated session. When write-next-available-address command 270 is issued, it is treated as in FIG. 9*a*. When write-within-fixated-session command 272 is issued, multimedia command interpreter 274 intercepts it, but instead of creating error condition 280, the command is passed first to extended command interpreter 284. Extended command interpreter 284 is a routine that handles what are known in the art as "vendor-unique" commands, which in this case includes a set of commands to write within a fixated session. Extended command interpreter 284 recognizes write-within-fixated-session command 272 as legal and passes it to data writer control 276, and the data is written by optical disc writer 278.

Under the circumstances in which write-within-fixated-session command 272 is issued, there are clearly fewer safeguards against bad writing events than in an industry-standard writer in FIG. 9*a*. This system requires that the host system be aware of legal writing addresses, obtained in steps 242 and 244 in FIG. 8.

It will be clear to those skilled in the art that a number of different methods can be used to provide industry-standard writing as depicted in FIG. 9*a*, and that there can be a number of ways to remove the necessary safeguard to provide writing within a fixated session as in FIG. 9*b*.

The invention has been described in detail with particular reference to certain preferred embodiments thereof, but it will be understood that variations and modifications can be effected within the spirit and scope of the invention.

| PARTS LIST | |
|---|---|
| 10 | Hybrid optical disc |
| 12 | Central hole |
| 14 | Power control area |
| 16 | Program management area |
| 18 | Preformed portion |
| 20 | Second mastered session |
| 22 | Writeable portion |
| 24 | Frequency-modulated wobbled groove |
| 26 | Frequency-and-depth-modulated wobbled groove |
| 27 | Writeable portion |
| 28 | Partial preformed session |
| 30 | Lead-in area |
| 32 | Data track area |
| 34 | Lead-out area |
| 36 | Data track |
| 36a | Partial data track |
| 36b | Unwritten partial track |
| 36c | Partial data track |
| 37 | Unwritten full track |
| 38 | Data track |
| 40 | Buffer zone |
| 42 | Buffer zone |
| 44 | Buffer zone |
| 46 | Buffer zone |
| 50 | Laser |
| 52 | Laser beam |
| 54 | Mirror |
| 56 | Optical modulator |
| 58 | Intensity-modulated laser beam |
| 60 | Photoresist master disc |
| 62 | Photoresist layer |
| 64 | Motor |
| 66 | Drive spindle |
| 68 | Motor rotational speed control |
| 70 | Lead |
| 72 | Radial position control |
| 74 | Radial position linkage |
| 76 | Direction of disc rotation |
| 78 | Optical modulator |
| 80 | Frequency-and intensity-modulated laser beam |
| 82 | Photoresist layer surface |
| 84 | Specified inner radius |
| 86 | Specified outer radius |
| 88 | Laser incidence point |
| 90 | Lead |
| 92 | Lead |
| 100 | Laser beam modulation control system |
| 110 | Clock |
| 112 | Lead |
| 114 | Lead |
| 116 | Lead |
| 120 | ATIP generator |
| 122 | Lead |
| 124 | Lead |
| 126 | ATIP driver |
| 130 | EFM generator |
| 132 | Digital data input lead |
| 134 | Lead |
| 136 | Lead |
| 138 | EFM driver |
| 140 | Logic circuit |
| 141 | Address input |
| 142 | Lead |
| 146 | Logic circuit |
| 148 | Lead |

-continued

PARTS LIST

| | |
|---|---|
| 150 | Master disc substrate |
| 151 | Depression |
| 152 | Data area |
| 154 | Unwritten area |
| 155 | Substrate |
| 156 | Groove |
| 157 | Writeable layer |
| 158 | Reflective layer |
| 159 | Protective overcoat |
| 160 | Block |
| 161 | Mark |
| 162 | Dummy file |
| 163 | Block |
| 164 | Block |
| 165 | Block |
| 166 | Block |
| 167 | Block |
| 168 | Block |
| 170 | Block |
| 172 | Block |
| 174 | Block |
| 176 | Block |
| 180 | Track link block |
| 180a | First track link block |
| 180b | Track link block |
| 182 | Track pre-gap |
| 184 | Track run-in block |
| 185 | Packet |
| 186 | Data file |
| 187 | Packet |
| 188 | Data file |
| 189 | Packet |
| 190 | Data file |
| 192 | Track run-out block |
| 194 | Track post-gap |
| 196 | Packet link block |
| 196a | Packet link block |
| 196b | Packet link block |
| 196c | Packet link block |
| 196d | Packet link block |
| 198 | Packet run-in block |
| 199 | Packet run-out block |
| 220 | Block |
| 222 | Block |
| 224 | Block |
| 226 | Block |
| 228 | Block |
| 230 | Block |
| 232 | Block |
| 240 | Block |
| 242 | Block |
| 244 | Block |
| 246 | Decision block |
| 248 | Block |
| 250 | Block |
| 252 | Block |
| 254 | Block |
| 256 | Block |
| 258 | Block |
| 260 | Block |
| 262 | Block |
| 264 | Multi-step block |
| 270 | Write-next-available-address command |
| 272 | Write-within-fixated-session command |
| 274 | Multimedia command interpreter |
| 276 | Data writer control |
| 278 | Optical disc writer |
| 280 | Error condition |
| 282 | Block |
| 284 | Extended command interpreter |

What is claimed is:

1. A hybrid disc comprising:

(a) a preformed portion; and (b) the preformed portion including a partial preformed session and a writeable portion including a wobbled groove which is adapted to be written to by a writer to complete the partial preformed session.

2. A hybrid disc comprising:

(a) a preformed portion and a first writeable portion, and (b) the preformed portion including a partial preformed session and a second writeable portion including a wobbled groove which is adapted to be written to by a writer to complete the partial preformed session.

3. A hybrid disc comprising:

(a) a substrate;

(b) a preformed portion formed in the substrate and a first writeable portion including a writeable layer formed on the substrate, and (c) the preformed portion including a partial preformed session formed by providing depressions in the substrate and a second writeable portion which includes a wobbled groove formed in the substrate and a writeable layer over the wobbled groove in which is written to complete the partial preformed session.

4. A hybrid disc comprising:

(a) a substrate;

(b) a preformed portion formed in the substrate and a first writeable portion including a writeable layer formed on the substrate and adapted to receive marks; and (c) the preformed portion including a partial preformed session formed by providing a frequency-and-depth-modulated wobbled groove in the substrate and a second writeable portion which includes a wobbled groove formed in the substrate and a writeable layer over the wobbled groove in which marks are written to complete the partial preformed session.

5. The hybrid disc of claim 4 wherein information in the frequency-and-depth-modulated wobbled groove (look up words) specifies the location of the second writeable portion.

6. A method for making a hybrid disc comprising the steps of:

(a) providing a substrate;

(b) forming a preformed portion in the substrate; the preformed portion including a partial preformed session formed by providing a frequency-and-depth-modulated wobbled groove in the substrate and a frequency-modulated wobbled groove which is not depth-modulated formed in the substrate;

(c) providing a writeable layer over the preformed portion and another writeable portion of the disc; and (d) writing marks in the writeable layer over the wobbled groove that is not depth-modulated to complete the partial preformed session.

* * * * *